(12) United States Patent
Kisu et al.

(10) Patent No.: US 7,279,638 B2
(45) Date of Patent: Oct. 9, 2007

(54) HARNESS STRUCTURE FOR A SLIDING DOOR

(75) Inventors: Naomi Kisu, Shizuoka (JP); Masataka Nishijima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/544,594

(22) Filed: Oct. 10, 2006

(65) Prior Publication Data

US 2007/0119610 A1    May 31, 2007

(30) Foreign Application Priority Data

Nov. 25, 2005   (JP) .............................. 2005-340053

(51) Int. Cl.
*H02G 3/00*   (2006.01)
(52) U.S. Cl. ................. 174/72 A; 174/72 C; 174/135; 174/69; 174/70 C; 174/70 R; 439/34
(58) Field of Classification Search ............. 174/72 A, 174/72 C, 135, 69, 68.3, 70 C, 70 R, 72 R, 174/71 R; 439/11, 34, 502, 503
See application file for complete search history.

(56) References Cited

U.S. PATENT DOCUMENTS 6,492,592 B1 * 12/2002 Murofushi et al. ........ 174/72 A

2002/0005014 A1    1/2002 Doshita et al.

FOREIGN PATENT DOCUMENTS

JP         2003-25850          1/2003

* cited by examiner

*Primary Examiner*—Dhiru R. Patel
(74) *Attorney, Agent, or Firm*—Kratz, Quintos & Hanson, LLP

(57) ABSTRACT

A wiring harness is horizontally swingably arranged from the sliding door to a vehicle body. A resilient member arranged at the sliding door energizes the wiring harness toward the vehicle body when the sliding door is fully closed, and energizes to bend the wiring harness when the sliding door is started to be opened. The wiring harness at the sliding door is supported by an oscillation member, and the resilient member energizes the wiring harness toward the vehicle body via the oscillation member. The oscillation member is mounted on a slider, the slider is engaged with a horizontal guiding rail, and the wiring harness is arranged from the slider to the oscillation member. The wiring harness is fixed to a fastening device at the vehicle body side, and the fastening device is arranged obliquely and outwardly against a direction of closing the sliding door. When the sliding door is fully closed, the wiring harness is horizontally supported along an oblong harness guiding member at the sliding door side.

4 Claims, 6 Drawing Sheets

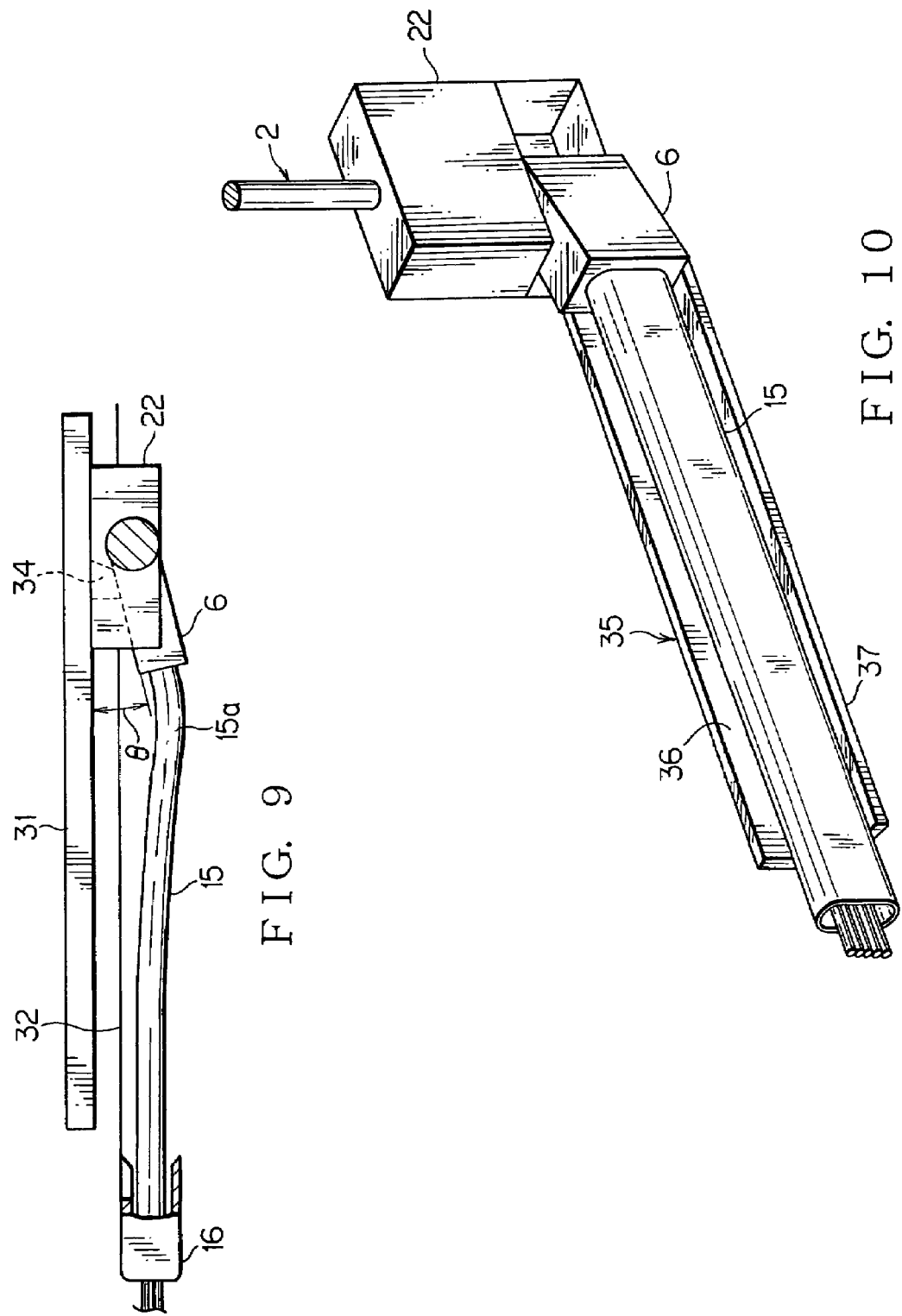

HARNESS STRUCTURE FOR A SLIDING DOOR

CROSS REFERENCE TO RELATED APPLICATIONS

This application is based on Japanese Patent Application No. 2005-340053, the contents of which are hereby incorporated by reference.

BACKGROUND OF THE INVENTION

1. Field of the Invention

The present invention relates to a harness structure for a sliding door.

2. Description of the Related Art

FIGS. 12 and 13 show one embodiment of a electric power supplying device 61 having a conventional harness structure for a sliding door (see JP 2003-25850, A (FIGS. 2 and 4)).

The electric power supplying device 61 includes: an oblong case 63 mounted on a sliding door 62 of a vehicle; a slider 64 slidably engaged with a guiding rail (not shown) of the case 63; an oscillation member 65 swingably supported by a vertical shaft of the slider in a horizontal direction; and an outer sheath 66 in a form of a caterpillar arranged bendably in substantially a U-shape inside the case and extended between the oscillation member 65 and a vehicle body (not shown).

The outer sheath 66 is covered by a tube 67 between the sliding door and the vehicle body. As shown in FIG. 13, a plurality of electric wires (wiring harness) 68 are inserted into insides of the outer sheath 66 and the slider 64. The outer sheath 66 in the form of the caterpillar regulates the wiring harness 68 in such a manner to bend only vertically or horizontally.

By opening the sliding door in a direction A (rear side) from a state shown in FIG. 12, the slider 64 is moved forward relative to the case 63, and the wiring harness 68 is extended in substantially a J-shape in the case 63 with the outer sheath 66. A harness slack is absorbed by expanding or contracting the wiring harness 68 and the outer sheath 66 in accordance with opening or closing the sliding door 62. The outer sheath 66 regulates a direction of bending the wiring harness 68.

However, regarding the electric power supplying device 61 having the conventional harness structure, because expensive and complex outer sheath 66 in the form of caterpillar is used for regulating the direction of bending the wiring harness, the electric power supplying device 61 becomes expensive, heavy and time-consuming for assembling the outer sheath 66. Further, because the oblong case is arranged on the sliding door 62, a layout for the other auxiliaries or members are restricted. Further, since the wiring harness 68 is bent in substantially a V-shape from the slider 64 to the oscillation member 65 when the sliding door 62 is opened or closed, there is a fear that durability of the wiring harness 68 may be decreased because a large bending stress works for a bending part 68a of the wiring harness 68.

These problems may be happen not only the sliding door 62 of a vehicle, but also a sliding door for processing machinery or the like.

According to the above, an object of the present invention is to provide a harness structure for a sliding door that can smoothly and surely regulate the direction of bending the wiring harness when the sliding door is moved even with a low cost outer sheath, that can be compact without a large space for a width direction of a thickness direction of the sliding door, and that can improve bending durability when the sliding door is moved.

SUMMERY OF THE INVENTION

In order to attain the object, according to the present invention, there is provided a harness structure for a sliding door including:

a wiring harness horizontally swingably arranged from the sliding door to a vehicle body, a resilient member arranged at the sliding door energizing the wiring harness toward the vehicle body when the sliding door is fully closed, and energizing to bend the wiring harness when the sliding door is started to be opened.

According to the above, when the sliding door is fully closed, the resilient member is compressed in a direction opposed to the vehicle body, and resiliently presses the wiring harness toward the vehicle body. When the sliding door is fully closed, the wiring harness is held between the sliding door and the vehicle body to be fixed. When the sliding door is moving, the sliding door is removed from the vehicle body outwardly, the wiring harness becomes free between the sliding door and the vehicle body, and the resilient member presses the wiring harness about the sliding door so that the wiring harness is initially bent to be projected toward the vehicle body. Thus, the wiring harness is smoothly bent and the sliding door is fully opened. The resilient member may be mounted on the wiring harness or the sliding door. The vertical wiring harness at the sliding door may be twistable, swingable, or bendable along the sliding door.

Preferably, the wiring harness at the sliding door is supported by an oscillation member, and the resilient member energizes the wiring harness toward the vehicle body via the oscillation member.

According to the above, the resilient member energizes the oscillation member and the wiring harness integrally toward the vehicle body. When the sliding door is initially opened, the resilient member energizes to bend the wiring harness in the vicinity of the oscillation member. The oscillation member may be mounted on the sliding door directly, or on a later-described slider.

Preferably, the oscillation member is mounted on a slider, the slider is engaged with a horizontal guiding rail, and the wiring harness is arranged from the slider to the oscillation member.

According to the above, when the sliding door is opened or closed, the slider is moved back or forth horizontally along the guiding rail, and the oscillation member is swung horizontally. When the sliding door is closed, the slider is moved along the guiding rail in a direction opposed to the closed sliding door. When the sliding door is opened, the slider is moved along the guiding rail in a direction opposed to the opened sliding door. The vertical wiring harness guided from the slider to the sliding door side may be twistable, swingable, or bendable along the sliding door. The guiding rail may be mounted on the case. The wiring harness at the sliding door side may be received in the case. Because the harness slack is absorbed by swinging the wiring harness horizontally from the sliding door to the vehicle body, a length of the guiding rail can be reduced, and a stroke of the slider can be reduced so that a space for arranging the wiring harness at the sliding door can be reduced.

Preferably, the wiring harness is fixed to a fastening device at the vehicle body side, and the fastening device is arranged obliquely and outwardly against a direction of closing the sliding door.

According to the above, when the sliding door is opened, a part of the wiring harness from the sliding door to the fastening device on the vehicle body is bent outward in a large radius so that the bending stress acting on the wiring harness is reduced.

Preferably, when the sliding door is fully closed, the wiring harness is horizontally supported along an oblong harness guiding member at the sliding door side.

According to the above, when the sliding door is fully closed, the wiring harness from the sliding door to the vehicle body is horizontally supported by the harness guiding member, so that the harness slack is prevented.

These and other objects, features, and advantages of the present invention will become more apparent upon reading of the following detailed description along with the accompanied drawings.

BRIEF DESCRIPTION OF THE DRAWINGS

FIG. 9 is a plan view showing the electric power supplying device with the other resilient member for regulating an angle;

FIG. 10 is a perspective view showing the electric power supplying device having a harness guiding member;

DETAILED DESCRIPTION OF THE PREFERRED EMBODIMENTS

Figure 3:
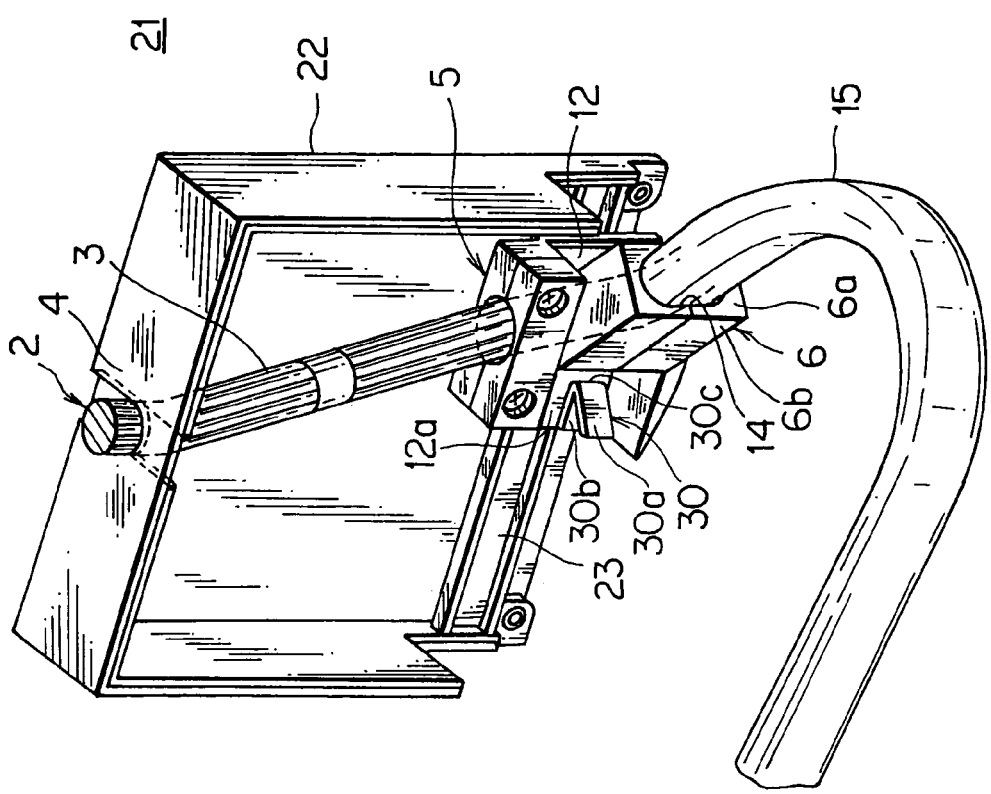
FIG. 3 is a perspective view showing an embodiment of the electric power supplying device changing a position of a resilient member.

An embodiment of an electric power supplying device 21 having a harness structure for a sliding door will be explained with reference to Figures.

The electric power supplying device 21 includes: a case 22 swingably receiving a drooping part 3 of a wiring harness 2; a horizontal guiding rail 23 mounted on a bottom of the case 22; a slider 5 slidably engaged with the guiding rail 23; and an oscillation member 6 horizontally swingably mounted on the slider 5. The wiring harness 2 is guided from the slider 5 through the oscillation member 6 to an outside horizontally. A resilient member 30 for pressing a case side (slider 5 in this embodiment) is mounted on the oscillation member 6.

Preferably, the case 22 is made of metal or synthetic resin, the guiding rail 23 is made of metal, and the slider 5 and the oscillation member 6 are made of synthetic resin. A top end of the drooping part 3 of the wiring harness 2 is fixed to a harness fixing part 4 of a top wall 24 of the case 22. The harness fixing part 4 may be a vertical thin board. The wiring harness 2 is fixed to the harness fixing part 4 with a tape or a band. The drooping part 3 of the wiring harness 2 is exposed as a plurality of electric wires from the harness fixing part 4 to the oscillation member 6, and partially tied with a tape.

Figure 1:
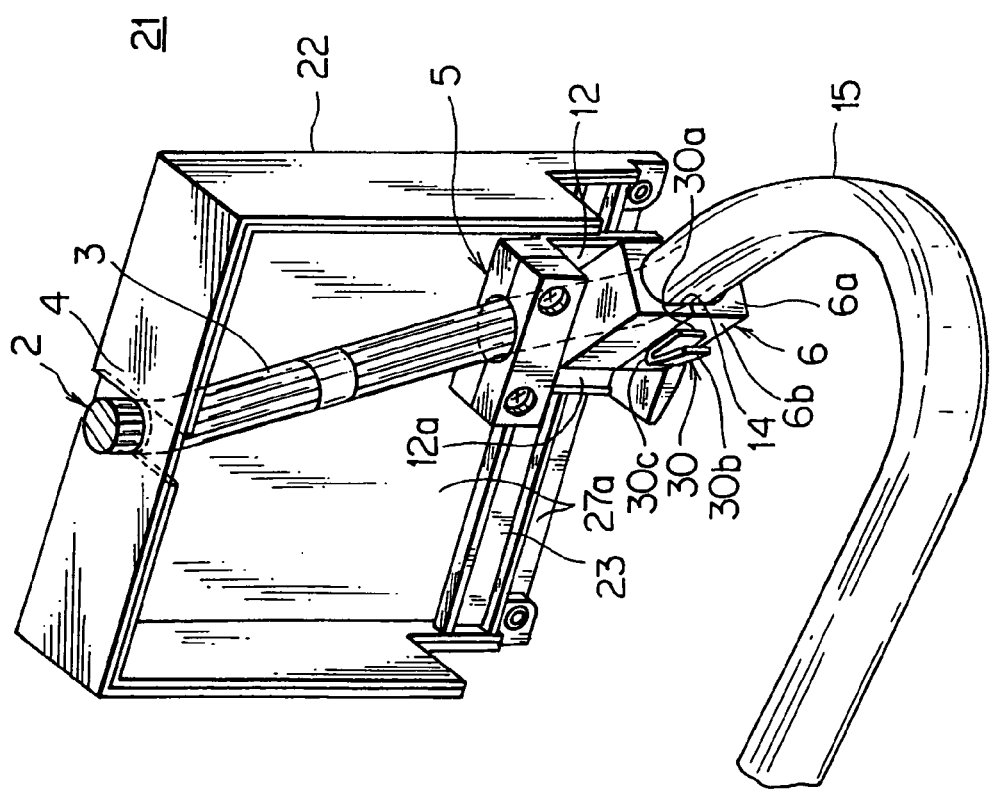
FIG. 1 is a perspective view showing an embodiment of a electric power supplying device having a harness structure for a sliding door according to the present invention when the sliding door is opened.
Figure 2:
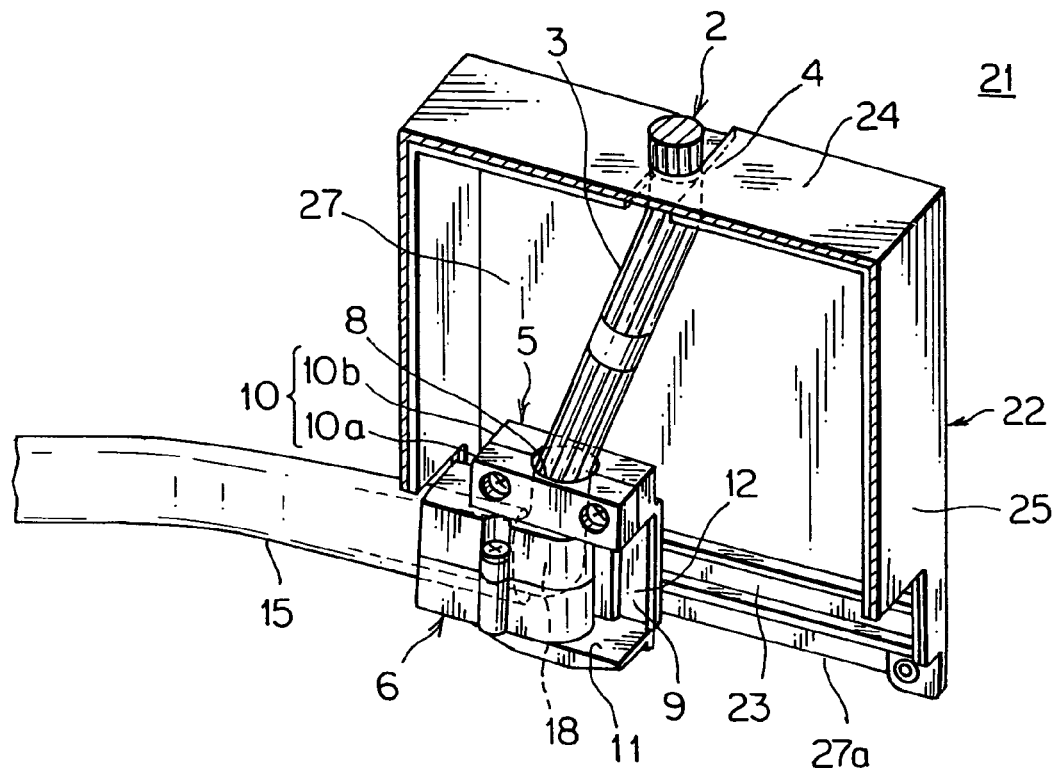
FIG. 2 is a perspective view showing the electric power supplying device when the sliding door is closed.

The guiding rail 23 is horizontally mounted at a bottom part 27a of a vertical base wall 27 of the case 22. Sidewalls 25 of the case 22 are notched at the both sides of the guiding rail 23. Thus, the oscillation member 6 and a part 15 of the wiring harness are swingable in a large angle. In FIGS. 1 and 2, a front cover of the case is not shown.

The slider 5 has a vertical harness insertion hole 8 at a top thereof, and a horizontal slit 9 for horizontally swingably supporting the oscillation member 6 at a bottom thereof. The horizontal slit 9 is a horizontal opening formed by horizontal walls 10, 11 of the slider 5 and a vertical wall 12. A part of the vertical wall 12 is slidably engaged with the guiding rail 23. The vertical harness insertion hole 8 is horizontally dividable at the center thereof. When an upper wall 10a is detached, the wiring harness 2 can be inserted into the vertical harness insertion hole 8.

For example, the oscillation member 6 has a not-shown shaft coaxial with the vertical harness insertion hole 8, and the shaft is rotatably engaged with a not-shown inner circular groove of the upper and lower walls 10, 11 of the slider 5. Alternatively, a hollow circular shaft (not shown) may be projected inside the upper and lower walls 10, 11 of the slider 5 coaxial with the vertical harness insertion hole 8, and may be rotatably engaged with the circular groove (not shown) of the upper and lower walls of the oscillation member 6.

The oscillation member 6 includes a vertical harness insertion hole (not shown) inside the circular coaxial shaft. The vertical harness insertion hole is continued to a horizontal harness insertion hole 14. The vertical harness insertion hole is formed in a circular section shape. The horizontal harness insertion hole 14 is formed in a portrait section or an oblong section corresponding to a corrugate tube 15 as a harness outer sheath made of synthetic resin, and continued from the oscillation member 6.

The oscillation member 6 is dividable vertically. The wiring harness 2 can be inserted into the harness insertion hole when the oscillation member 6 is divided. Upper and lower parts of the oscillation member 6 are fixed to each other by such as a bolt, a locking nail, an engaging convex, or the like.

The case 22 is fixed to an inner panel of the sliding door. A front end 6a of the oscillation member 6 faces the vehicle body, and is swingable in a longitudinal direction of the vehicle body.

A part of the corrugate tube 15 is fixed in the horizontal harness insertion hole 14 of the oscillation member 6. The corrugate tube 15 is an existing corrugate tube having a good bendability. A rib (not shown) is projected from an inner circular wall of the horizontal harness insertion hole 14 of the oscillation member 6. A concave groove of the corrugate tube 15 having an oblong cross section is engaged with the rib. When using a corrugate tube having a circular cross section (not shown), the rib holds the corrugate tube 15 rotatably. A plurality of coated wires 17 is inserted into the corrugate tube to form the wiring harness.

A resilient member 30 is mounted on an outer sidewall 6b of the oscillation member 6. Because the oscillation member 6 is dividable vertically, it is preferable that the resilient member 30 is mounted on upper or lower part of the outer sidewall 6b, or the resilient member 30 is divided vertically. The sidewall 6b faces the vehicle body when the sliding door is open (FIG. 1), and faces the sliding door when the sliding door is closed (FIG. 2).

The resilient member 30 according to the present invention is a flat spring formed in substantially a V-shape and made of metal or synthetic resin. The resilient member 30 is composed of plate parts 30a, 30b and a bending part 30c continued to the plate parts 30a, 30b. The plate part 30a of the resilient member 30 may be fixed to the outer wall 6b of the oscillation member 6 by insert molding integrally. Alternatively, the plate part 30a may be engaged with a pair of guides (not shown) formed in substantially an L-shape and projected from the outer sidewall 6b of the oscillation member 6. Alternatively, the plate part 30a may be foxed to the outer sidewall 6b by adherence, welding, or the like.

When the resilient member 30 is made of synthetic resin, the resilient member 30 and the oscillation member 6 may be integrally molded. In this case, the plate part 30a is unnecessary and only the plate part 30b is obliquely projected from the outer sidewall 6b of the oscillation member 6.

As the resilient member 30, the coil spring (not shown) or the like may be used instead of the flat spring. Elastomer material (not shown) such as flexible rubber, urethane, sponge may be used instead of the spring.

When the sliding door is turned to be closed (FIG. 2) from the opened state (FIG. 1), the oscillation member 6 is turned, and the resilient member 30 resiliently contacts an inner wall 12a of a vertical wall of the slider 5. If the wall 12 of the slider 5 is notched, the resilient member 30 may resiliently contact the guiding rail 23 at the case 22, an upper side of the guiding rail 23, or a vertical base wall 27a at a lower part of the case 22.

As shown in FIG. 3, the resilient member 30 may be mounted on the inner wall 12a of the vertical wall 12 of the slider 5, not on the oscillation member 6. In this case, the resilient member 30 is common to that in FIG. 1. The bending part 30c of the resilient member 30 faces the shaft of the oscillation member 6, and the plate part 30a is opposed to the outer sidewall 6b when the oscillation member 6 is turned. The plate part 30b is fixed to the inner wall 12a of the vertical wall 12 of the slider 5.

The plate part 30b may be fixed to the vertical wall 12 by insert molding, or the resilient member 30 may be formed integrally with the vertical wall 12 made of synthetic resin. The plate part 30a is positioned outward from the inner wall 12a of the vertical wall 12.

When the vertical wall 12 of the slider 5 is notched in substantially a rectangular shape, the resilient member 30 may be mounted on the guiding rail 23 or the case 22, not on the slider 5. Further, the resilient member 30 may be inserted into the notch (not shown) and resiliently contact the outer sidewall 6b of the oscillation member 6. In this case, a shape of the resilient member 30 is not limited to substantially the V-shape, and various shapes may be used. Configurations in FIG. 3 except the position of the resilient member 30 is common to those in FIG. 1. Therefore, identical numbers are used for the identical parts.

In embodiments shown in FIGS. 1 and 2, the other end of the corrugate tube 15 guided from the oscillation member 6 is fixed to a harness fastening device 16 (FIGS. 14, 15) at the vehicle body side by the rib (not shown) similar to that in the oscillation member 6. A plurality of electric wires 17 is guided out to the vehicle body side (battery side) from the harness fastening device 16 and connected to a wiring harness (not shown) at the vehicle body side. The harness fastening device 16 is fixed to the vehicle body by such as a bolt.

The wiring harness 2 is covered by the corrugate tube 15 from the oscillation member 6 to the harness fastening device 16, and arranged horizontally. Incidentally, the wiring harness 2 may be a generic name including the corrugate tube 15, and a generic name for the electric power supplying device 21 including the harness fastening device 16.

Figure 4:
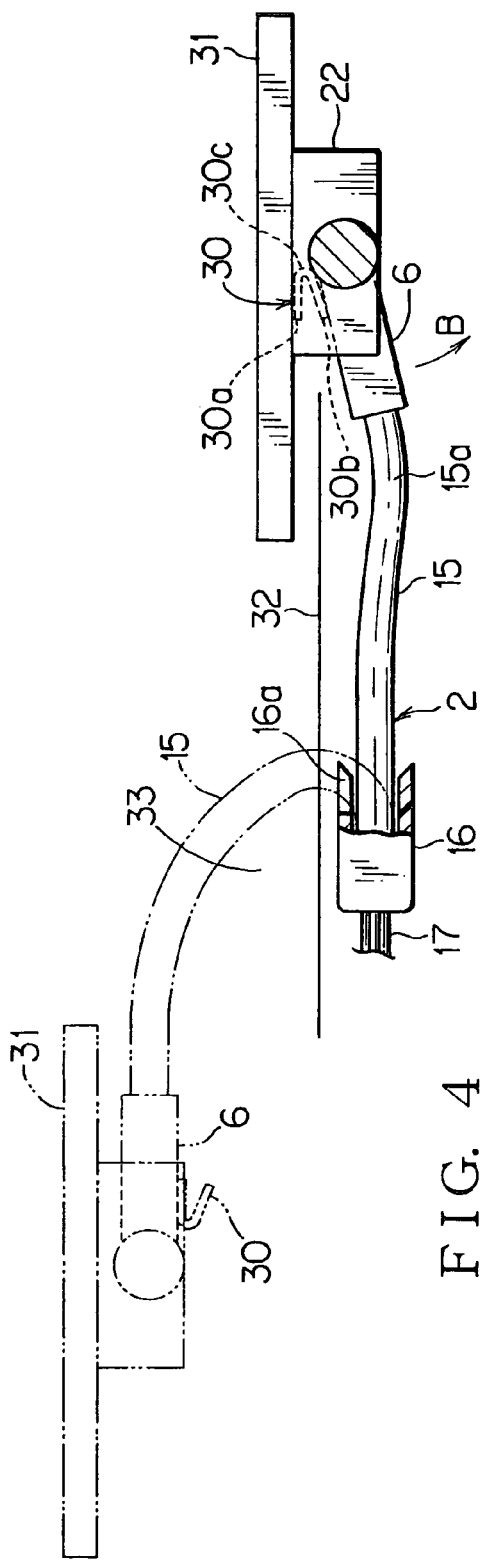
FIG. 4 is a plan view showing the electric power supplying device.

As shown in FIG. 4, a solid line shows the sliding door 31 in FIG. 2 just before closing (just after opening), and a chain line shows the sliding door 31 fully closed. After FIG. 4, showing and explanation of the slider 5 are omitted. In FIGS. 4 to 8, the resilient member 30 is mounted on the oscillation member 6. However, operations are the same if the resilient member 30 in FIG. 3 is mounted on the slider 5, the guiding rail 23, and the case 22.

When the sliding door 31 is closed, the case 22 is moved forward integrally with the sliding door 31. Then, the oscillation member 6 is turned obliquely backward about the shaft (not shown). Then, the drooping part 3 of the wiring harness 2 is twisted (clockwise in FIG. 2) between the harness fixing part 4 and the oscillation member 6 to absorb the turning of the oscillation member 6. Then, a horizontal part (corrugate tube 15) of the wiring harness 2 is pulled backward between the oscillation member 6 and the harness fastening device 16 and extended substantially straight.

In FIG. 4, when the sliding door 31 is fully closed, the substantially V-shaped resilient member 30 is closed (the plate parts 30a, 30b are close to each other) against the resilient force of the spring. As shown in the solid line in FIG. 4, when the sliding door 31 is opened from the fully closed state, the vehicle body 32 is separated outward, the resilient member 30 is opened, and the energizing force of the resilient member 30 turns the oscillation member 6 in a direction of an arrow B toward an inside of the vehicle body 32.

An operation of the sliding door 31 separating from the vehicle body 32 outwardly is done along a guiding rail (not shown) bending substantially an S-shape at the vehicle body side.

As the oscillation member 6 turns, the horizontal harness part (corrugate tube 15) is bend toward the inside of the vehicle body near the oscillation member 6 (bending part is indicated by a mark 15a). As shown in the dash line in FIG. 4, when the sliding door 31 is open, the bent corrugate tube 15 is energized so that the corrugate tube 15 is bent smoothly and surely in a specific path.

Namely, the initial bent of the corrugate tube 15 at the bending part 15a is a preliminary bent for smoothly and surely turning the corrugate tube 15 in the specific path when the sliding door 31 is opened. Even using the cheap, light-weighted, and simple structured corrugate tube 15 without the expensive caterpillar, the preliminary bent allows the corrugate tube 15 to be bent in a specific path.

The dashed line in FIG. 4 corresponds to the fully opened state of the sliding door in FIG. 1. The case 22 is moved backward with the sliding door 31 integrally from the initial door open state shown in the solid line in FIG. 4. The sliding door 31 is removed outward from the vehicle body 32. Then, the oscillation member 6 is turned about the shaft in the direction of the arrow B. The drooping part 3 is twisted (counterclockwise in FIG. 1) to absorb the turning of the oscillation member 6. The corrugate tube 15 is bent between the sliding door 31 and the vehicle body 32 in substantially a U or J-shape about the harness fastening device 16. The harness fastening device 16 of this embodiment is substantially a rectangular piped shape, and a top end of the harness fastening device 16 at the door side is notched for guiding the corrugate tube 15 (the nothced part is indicated by a mark 16a).

Figure 5:
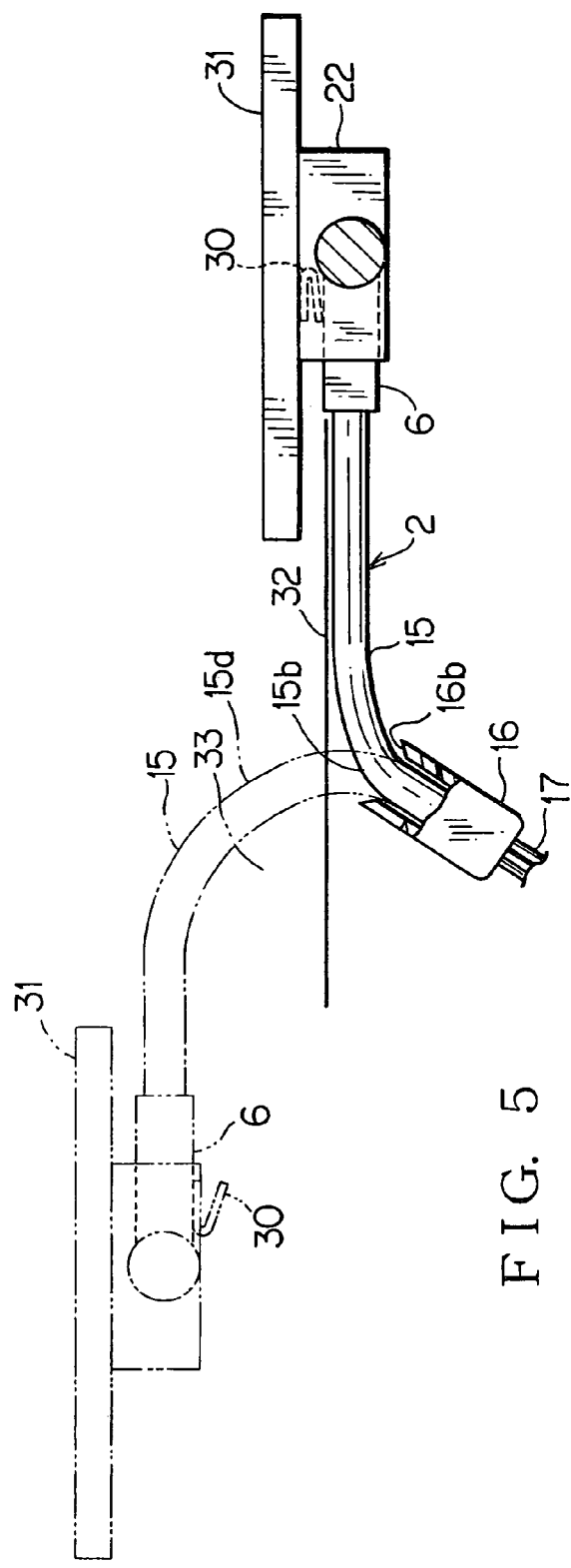
FIG. 5 is a plan view showing the electric power supplying device changing a position of a fastening device.

In the embodiment shown in FIG. 4, the harness fastening device 16 faces front and is positioned substantially parallel to the vehicle body 32 (sliding door 31). However, as shown in FIG. 5, if an opening 16b of the top end of the harness fastening device 16 is positioned obliquely front against the vehicle body 32, the swing angle of the corrugate tube 15 at the fully opened sliding door 31 can be reduced, and a bending radius can be increased. Therefore, bending durability of the corrugate tube 15 is improved.

Further, because the corrugate tube 15 is energized toward the sliding door 31 when the sliding door 31 is fully closed as shown in a solid line in FIG. 5, shaking of the corrugate tube 15 in a vehicle width direction is prevented. Because the corrugate tube 15 has a stiffness, the bent corrugate tube 15 presses the door.

In a solid line in FIG. 5, when the sliding door 31 is fully closed, the resilient member 30 is closed (contracted), and energizes the oscillation member 6 against the vehicle body. However, because the corrugate tube 15 contacts the vehicle body 32 and the sliding door 31 between the oscillation member 6 and the harness fastening device 16, the oscillation member 6 is not rotated to the vehicle body side with the energizing force of the resilient member 30.

Figure 6:
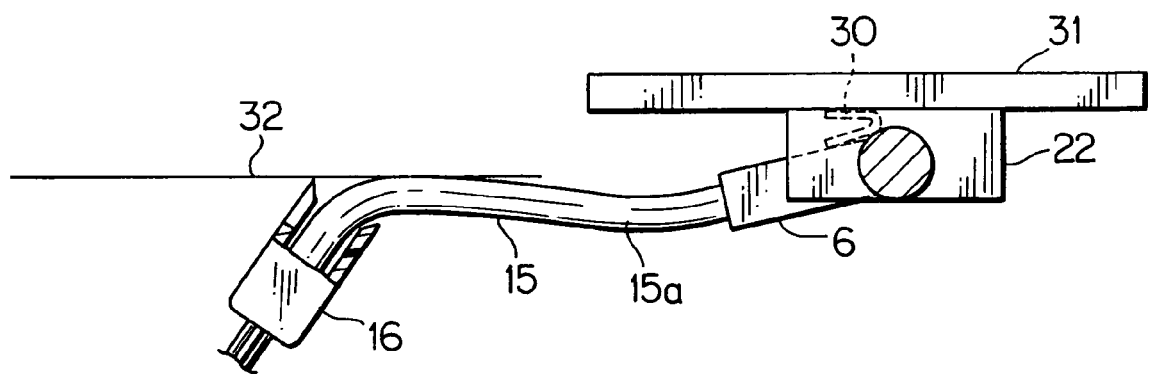
FIG. 6 is a plan view showing the electric power supplying device when the door is started to be opened.
Figure 7:
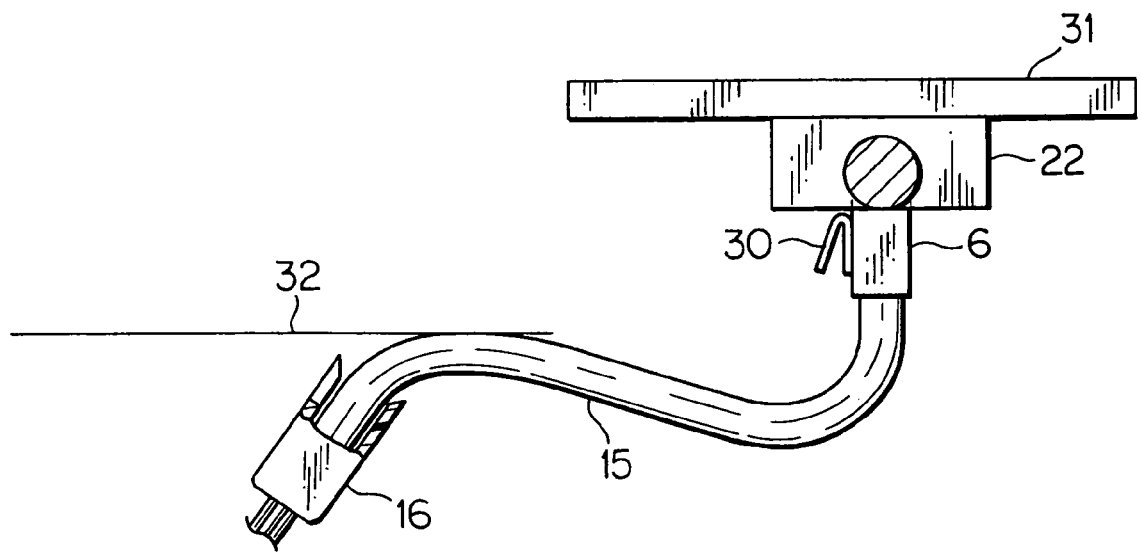
FIG. 7 is a plan view showing the electric power supplying device when the door is removed from a vehicle body.

When the sliding door 31 is started to be opened from the state shown in the solid line in FIG. 5, the resilient member 30 rotates the oscillation member 6 toward the vehicle body as shown in FIG. 6. Then, the corrugate tube 15 is bent toward the vehicle body near the oscillation member 6 (the bent part is indicated as a mark 15a). As shown in FIG. 7, when the sliding door 31 is removed outwardly from the vehicle body 32 along the guiding rail (not shown), the oscillation member 6 is rotated to a position substantially perpendicular to the sliding door 31, and the corrugate tube 15 is bent in substantially a S-shape with a large bent radius.

Figure 8:
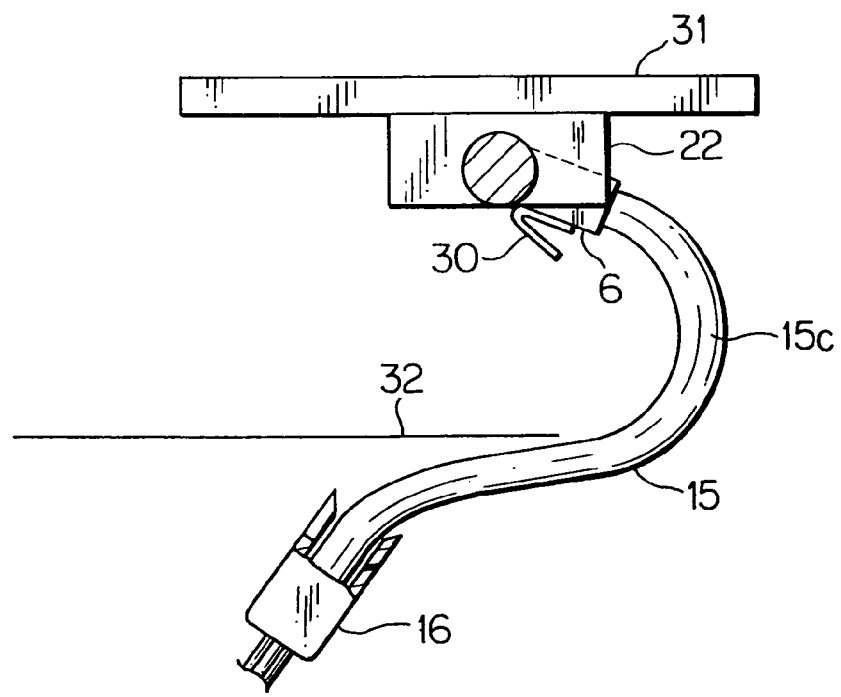
FIG. 8 is a plan view showing the electric power supplying device when the door is half opened.

As shown in FIG. 8, when the sliding door 31 is half opened, the corrugate tube 15 is folded smoothly (folded part is indicated as a mark 15c) toward a rear side of the vehicle. As shown in the dash line in FIG. 5, when the sliding door 31 is fully opened, the corrugate tube 15 is smoothly bent in a specific path and pulled backward about the harness fastening device 16.

Thus, because the energizing force of the resilient member 30 in FIG. 6 rotates initially the oscillation member 6, the corrugate tube 15 is smoothly bent with a small force without an undesired deformation such as buckling when the sliding door 31 is opened. Therefore, the bent durability of the corrugate tube 15 and opening operability of the sliding door 31 are improved. By positioning the harness fastening device 16 at the obliquely front position, the bent radius at the bent part 15d of the corrugate tube 15 when the sliding door 31 is fully closed is increased, and the bent durability of the corrugate tube 15 is also increased.

FIG. 9 shows an embodiment using a block resilient member 34 instead of the resilient member 30. The block resilient member 34 may be mounted on the oscillation member 6 or on the sliding door 31 side (for example, the base wall 27 of the case 22).

When the sliding door 31 is fully closed, the block resilient member 34 is contracted, and the oscillation member 6 and the corrugate tube 15 are positioned parallel to the sliding door 31. The harness fastening device 16 may be positioned obliquely front as shown in FIG. 5. As shown in FIG. 9, when the sliding door 31 is started to be opened, an energizing force of the block resilient member 34 rotates the oscillation member 6 in an angle θ toward the vehicle body 32, and the corrugate tube 15 is started to be bent (initial bent part is indicated as a mark 15a).

Incidentally, when using a block solid member (angle regulation member) instead of the block resilient member 34, the energizing force is not generated, however, because the block solid member positions the oscillation member 6 and the corrugate tube 15 at the vehicle body side when the sliding door 31 is fully closed, the block solid member regulates the bent direction of the corrugate tube 15. However, a space for the oscillation member 6 and the bent part 15a projecting toward the vehicle body 32 side is necessary when the sliding door 31 is fully closed. Further, the door fully closed state in a long time may form a bent part on the corrugate tube 15.

Figure 11:
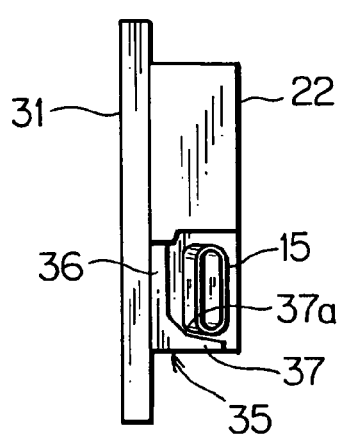
FIG. 11 is a longitudinal section view showing the electric power supplying device having the harness guiding member.
Figure 13:
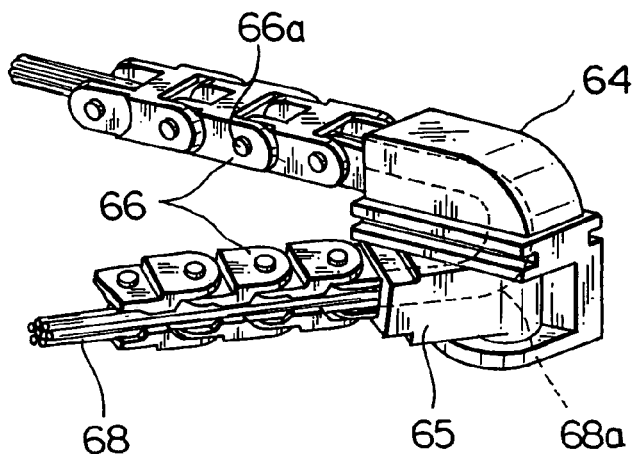
FIG. 13 is a perspective view showing a main part of the conventional electric power supplying device.
Figure 12:
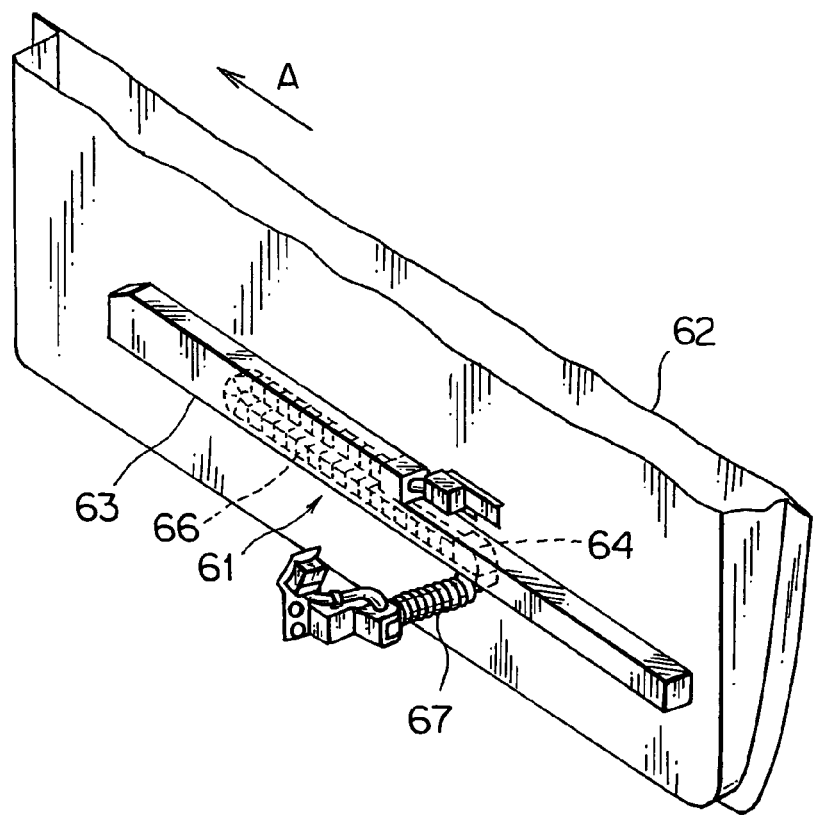
FIG. 12 is a perspective view showing an embodiment of a conventional electric power supplying device for a sliding door.

FIGS. 10 and 11 shows an embodiment using a horizontally long harness guiding member 35 to support the corrugate tube 15 guided out of the case 22 for preventing a slack or a rattle of the corrugate tube 15.

The harness guiding member 35 is formed in substantially an L-shape and composed of a long and narrow vertical wall 36 and a long and narrow horizontal wall 37. An inner wall of the horizontal wall 37 is extended obliquely upward to the vertical wall 36. A slope 37a makes the corrugate tube 15 easy to remove from the harness guiding member 35 and makes the corrugate tube 15 easy to be received in the harness guiding member 35. Incidentally, even if the slope 37a is replaced with a horizontal wall (not shown), the harness guiding member 35 can prevent the slack and the rattle of the corrugate tube 15.

In this embodiment, the harness guiding member 35 is fixed to the case 22. The harness guiding member 35 may be molded integrally with the case 22. Further, the harness guiding member 35 may be formed separately from the case 22, and may be fixed to a door inner panel of the sliding door 31, or may be formed integrally with the door inner panel. As shown in FIG. 5, preferably, the harness fastening device 16 is positioned at the obliquely front position.

In the each embodiment, as shown in FIG. 2, the drooping part 3 is horizontally arranged and horizontally swingable in the case 22. However, the drooping part 3 may be guided from the sidewall 25 not the upper wall of the case 22, and may be bent in the case 22, and be extended and contracted horizontally.

Further, the case 22 and the guiding rail 23 in FIG. 1 may be cancelled, and the slider 5 may be fixed to the door inner panel of the sliding door 31 as an unslidable member, and the oscillation member 6 may be swung horizontally accompanying with the open and close of the sliding door 31 and the drooping part 3 of the wiring harness 2 may be twistable about the harness fixing part 4 at the door inner panel. In this case, the resilient member 30, 34 mounted on the oscillation member 6 resiliently contacts the door inner panel to rotate the oscillation member 6 initially (corresponding to the state in FIG. 6). Thus, the harness structure at the sliding door 31 (vehicle body 32) side can be changed properly.

Further, the guiding rail 23 and the slider 5 may be canceled, the drooping part 3 of the wiring harness 2 may be fixed to the door inner panel, and the wiring harness 2 may be bent at right angle from the drooping part 3 (bent part is indicated as a mark 18), then the corrugate tube 15 may be arranged toward the vehicle body 32. When the sliding door 31 is fully closed, the corrugate tube 15 may be energized toward the vehicle body 32 by the resilient member 30, 34 in the vicinity of the bent part 18. In this case, the resilient member 30, 34 may be mounted on the corrugate tube 15, or on the door inner panel.

Further, in each embodiment, the corrugate tube 15 is used. However, other tubes such as an accordion hose made of rubber can be used.

Further, in each embodiment, the electric power supplying device 21 is mounted on the sliding door 31 of a vehicle. However, the electric power supplying device 21 may be mounted on other sliding door, such as the sliding door for processing machinery.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A harness structure for a sliding door comprising:
   a wiring harness horizontally swingably arranged to move in a direction from the sliding door to a vehicle body, wherein the wiring harness at the sliding door is supported by a horizontally swingable oscillation member, and
   a resilient member arranged at the sliding door to have the potential to energize the wiring harness toward the vehicle body via the oscillation member when the sliding door is fully closed, and energizing to bend the wiring harness when the sliding door is started to be opened.

2. The harness structure for a sliding door as claimed in claim 1, wherein the oscillation member is mounted on a slider, the slider is engaged with a horizontal guiding rail, and the wiring harness is arranged from the slider to the oscillation member.

3. The harness structure for a sliding door as claimed in claim 1, wherein the wiring harness is fixed to a fastening device at the vehicle body side, and the fastening device is arranged obliquely and outwardly against a direction of closing the sliding door.

4. The harness structure for a sliding door as claimed in claim 1, wherein when the sliding door is fully closed, the wiring harness is horizontally supported along an oblong harness guiding member at the sliding door side.

* * * * *

UNITED STATES PATENT AND TRADEMARK OFFICE
Certificate

Patent No. 7,279,638 B2

Patented: October 9, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Naomi Kisu, Shizuoka (JP); Masataka Nishijima, Shizuoka (JP); Motonari Inagaki, Nishikasugai (JP); and Tomoaki Nishimura, Kariya-shi, Aichi-ken (JP)

Signed and Sealed this Twenty-third Day of March 2010.

DIEGO F. F. GUTIERREZ
*Supervisory Patent Examiner*
Art Unit 2831